US012720301B2

(12) United States Patent
Ives et al.

(10) Patent No.: US 12,720,301 B2
(45) Date of Patent: Aug. 25, 2026

(54) LIMITED COMMUNICATION CAPABILITY NOTIFICATIONS

(71) Applicant: T-Mobile USA, Inc., Bellevue, WA (US)

(72) Inventors: Derrick L. Ives, North Bend, WA (US); Mehul Shah, Bellevue, WA (US); Ryan P. Dreiling, Shawnee, KS (US); Helen Wang, Bellevue, WA (US); Thomas P. Lucht, Seattle, WA (US); Michele Lundahl, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 392 days.

(21) Appl. No.: 18/424,637

(22) Filed: Jan. 26, 2024

(65) Prior Publication Data

US 2025/0247688 A1 Jul. 31, 2025

(51) Int. Cl.
*H04W 8/22* (2009.01)
*H04W 4/12* (2009.01)
*H04W 4/50* (2018.01)
*H04W 84/06* (2009.01)

(52) U.S. Cl.
CPC ............... *H04W 8/22* (2013.01); *H04W 4/12* (2013.01); *H04W 84/06* (2013.01)

(58) Field of Classification Search
None
See application file for complete search history.

(56) References Cited

U.S. PATENT DOCUMENTS 7,558,568 B2 7/2009 Karabinis
8,078,162 B2 12/2011 Deaton et al.
8,265,637 B2 9/2012 Karabinis
11,337,130 B2 5/2022 Wei et al.
11,552,697 B2 1/2023 Wei et al.
(Continued)

FOREIGN PATENT DOCUMENTS

CN 107809277 B 2/2020
CN 112567810 A 3/2021
(Continued)

OTHER PUBLICATIONS

International Search Report and Written Opinion from PCT App. No. PCT/US2025/012965 mailed Jun. 10, 2025, 11 pages.

*Primary Examiner* — Duc T Duong
(74) *Attorney, Agent, or Firm* — Ashurst Perkins Coie US LLP

(57) ABSTRACT

The present technology relates to limited communication capability notifications. In aspects, non-terrestrial networks can be resource-constrained such that limited wireless communication services are provided to connected wireless communication devices. Accordingly, a user of a first wireless communication device connected to or about to connect to a non-terrestrial network or a user of a second wireless communication device contacting the first wireless communication device can benefit from being notified that the first wireless communication device has or is about to have reduced wireless capability (e.g., due to it being connected to a resource-constrained non-terrestrial network). To accomplish this, aspects of the present technology relate to providing such notifications.

20 Claims, 9 Drawing Sheets

(56) References Cited

U.S. PATENT DOCUMENTS

| | | | | |
|---|---|---|---|---|
| 11,743,799 | B2 | 8/2023 | Wei et al. | |
| 11,751,165 | B2 | 9/2023 | Wei et al. | |
| 2011/0136428 | A1 | 6/2011 | Ritter | |
| 2014/0274111 | A1 | 9/2014 | Edge et al. | |
| 2021/0306927 | A1 | 9/2021 | Wei et al. | |
| 2022/0141641 | A1* | 5/2022 | Ramprasad | H04W 36/32 370/329 |
| 2022/0337310 | A1 | 10/2022 | Wei et al. | |
| 2022/0368411 | A1 | 11/2022 | Speidel et al. | |
| 2023/0066232 | A1 | 3/2023 | Caro et al. | |
| 2023/0300692 | A1* | 9/2023 | Ashari | H04B 7/18563 370/331 |
| 2023/0327748 | A1 | 10/2023 | Rommer et al. | |
| 2023/0362640 | A1 | 11/2023 | Edge | |
| 2024/0163708 | A1 | 5/2024 | Kumar et al. | |
| 2024/0259085 | A1* | 8/2024 | Gupta | H04B 7/1851 |
| 2025/0350925 | A1* | 11/2025 | Sipra | H04W 8/205 |

FOREIGN PATENT DOCUMENTS

| | | | |
|---|---|---|---|
| CN | 112088563 | B | 10/2021 |
| DE | 102020132897 | A1 | 12/2021 |
| EP | 3026453 | B1 | 1/2019 |
| JP | 4467080 | B2 | 3/2010 |
| JP | 7162034 | B2 | 10/2022 |
| KR | 20140010624 | A | 1/2014 |
| KR | 102484056 | B1 | 1/2023 |
| WO | 2023059259 | A1 | 4/2023 |

* cited by examiner 400
308-2
304-2
304-1
308-3
308-1
304-3
306
302

LIMITED COMMUNICATION CAPABILITY NOTIFICATIONS

BACKGROUND

Current wireless communications systems (e.g., a fifth-generation mobile network (5G)) utilize base stations to communicate with a user equipment. Base stations can be located at the surface of the Earth and support telecommunications coverage in a surrounding area. When in a coverage region of the base station, the user equipment can connect with the base station to communicate data through the network. Currently, the sixth-generation mobile system standard (6G) is under development. Within 6G, the user equipment can communicate directly with an orbiting satellite. The user equipment can connect to the satellite when within its coverage region. In general, a satellite can provide a larger coverage region and can more easily provide coverage to remote locations. Accordingly, network providers are utilizing satellite networks to increase coverage and provide improved networks.

BRIEF DESCRIPTION OF THE DRAWINGS

Detailed descriptions of implementations of the present invention will be described and explained through the use of the accompanying drawings.

Figure 1:
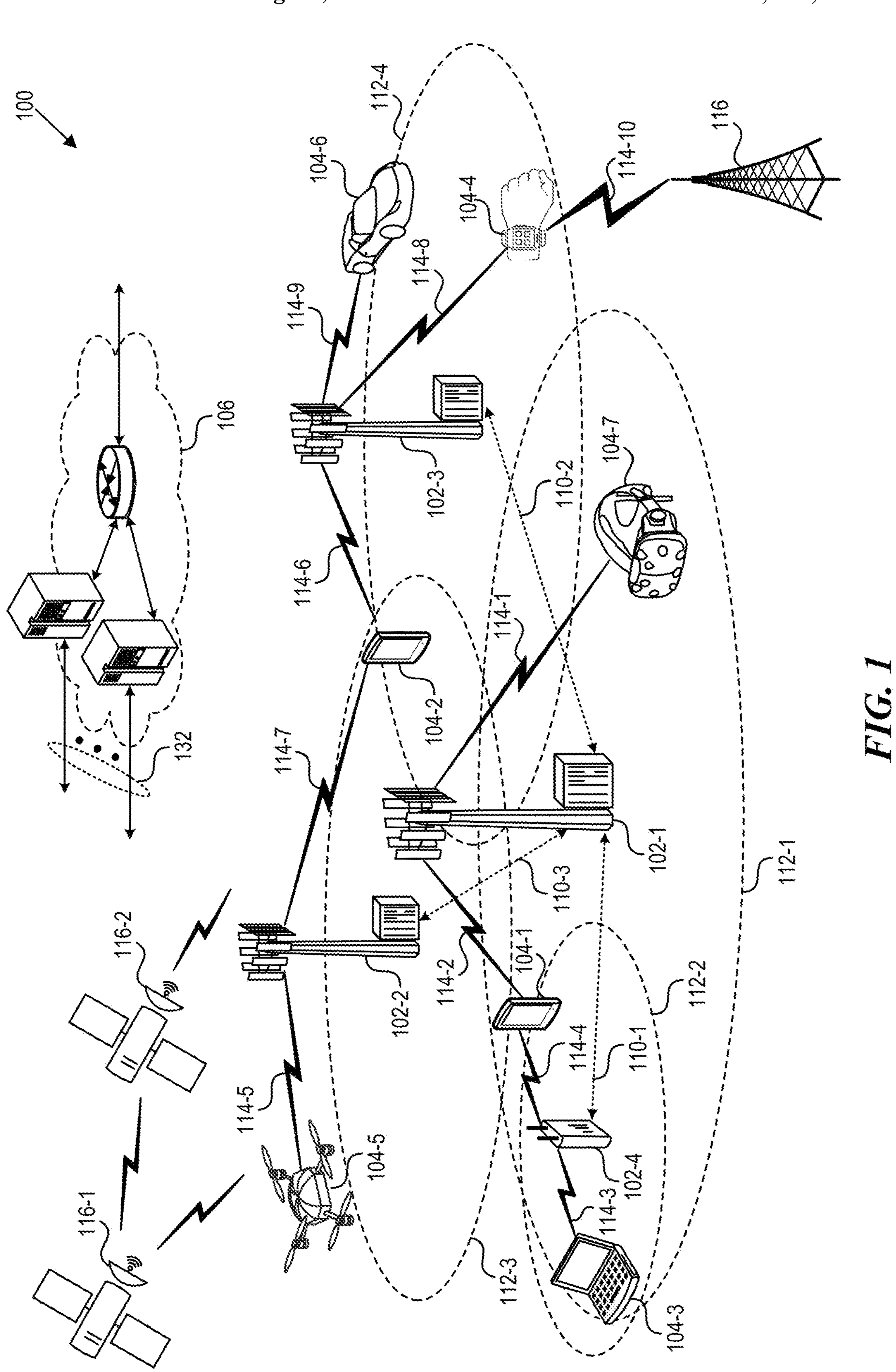
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless communication, such as 6G, utilize satellites to improve network coverage. Given that satellites are not bound to the surface of the Earth, satellites can provide a larger coverage region than base stations and more easily provide coverage in remote locations. As a consequence of this increased coverage region, a greater number of users may compete for communication resources provided by these satellite-implemented, non-terrestrial networks, thereby increasing congestion. This congestion can be worsened by the limited wireless resources that are provided by these networks. For example, non-terrestrial networks can be difficult or costly to implement, resulting in these networks having decreased bandwidths or greater latency. Thus, non-terrestrial networks can be resource constrained due to increased competition for limited communication resources.

Given that non-terrestrial networks can be more resource constrained than terrestrial networks implemented through surface-bound base stations, mobile network providers can choose to disable some wireless services on non-terrestrial networks. As a particular example, mobile network providers may choose to disable message, voice call, or data services on non-terrestrial networks. Given the difference in capabilities of the network, a user of the wireless device can benefit from being informed that he or she has connected to a wireless network, and more specifically, to the services available on the wireless network. In particular, the user can benefit from knowledge that he or she is connected to a resource-constrained network, such as a non-terrestrial network, due to reduction in available services on such a network. To accomplish this, a wireless device can display an indication that the wireless device is connected to or is about to connect to a non-terrestrial network. The indication can include a prediction of when the wireless device will connect to the non-terrestrial network, one or more services that are available or not available on the non-terrestrial network, or a cost of the non-terrestrial network providing those services to the wireless device. In some cases, the indication is provided before connecting to the non-terrestrial network, thus enabling the user to utilize the full resources of the terrestrial network to which he or she is connected before connecting to the resource-constrained, non-terrestrial network.

Moreover, some mobile network providers can reduce network traffic on the non-terrestrial network traffic by disabling their subscribers from connecting to a non-terrestrial network when a terrestrial network is available to provide a same or alternative wireless service. Given this relationship between connection to a non-terrestrial network and the availability of a terrestrial network, a wireless device or a wireless network can determine that the wireless device is about to connect to a non-terrestrial network by comparing the location of the wireless device to a coverage region provided by one or more terrestrial networks. For example, the location of the wireless device can be used to determine that the wireless device is proximate to a boundary of the coverage region (e.g., defined by coverage maps of the terrestrial networks). It can thus be determined that the wireless device is about to connect with a non-terrestrial network when the wireless device is proximate to a boundary of the coverage region. In some cases, past location data can be used to determine that the wireless device is moving closer to the boundary of the coverage region, and this information can be used to determine that the wireless device is about to connect to a non-terrestrial network when the wireless device is proximate to and moving closer to the boundary of the coverage region. In yet other aspects, the location and the movement of the wireless device can be used to predict an amount of time until the wireless device leaves the coverage region, which can be used to determine if the wireless device is about to connect to the non-terrestrial network.

In response to the determination that the wireless device is about to connect to the non-terrestrial network, a message indicative of the services available or unavailable on the non-terrestrial network can be displayed. Alternatively or additionally, the message can be displayed after the wireless device connects to the non-terrestrial network. The message can provide an indication of one or more wireless services available or unavailable on the non-terrestrial network. For example, the message can indicate that the messaging services are available on the non-terrestrial network but voice calling services and data services are unavailable. In some cases, the message can indicate a cost associated with different services based on a subscription plan of the wireless device. In aspects, the message can be created by the wireless device without intervention from the terrestrial or non-terrestrial network (e.g., beyond providing coverage maps or location services). In other cases, the message can be generated by the terrestrial or non-terrestrial network and transmitted to the wireless device. In general, the message can indicate to a user of the wireless device that the wireless device is connected to or is about to connect to a non-terrestrial network and can provide information about the wireless services that are available on the non-terrestrial network.

As discussed, communication services can be limited on a non-terrestrial network or other resource-constrained network. Accordingly, other wireless devices that may contact a first wireless device connected to the resource-constrained network can benefit from receiving a notification that the first wireless device has limited communication capability due to it being connected to a resource-constrained network. It may be overly burdensome, however, to notify all of the other wireless devices that could possibly contact the first wireless device. Thus, the notification that the first wireless device has limited communication capability can be transmitted to a subset of the other wireless devices that are most important to contact.

As one example, the notification can be transmitted to a close contact list. The close contact list can include contact information associated with second wireless devices of close friends and family of the user of the first wireless device. In aspects, the close contact list can be provided by the user of the first wireless device. For example, the user of the first wireless device can place his or her mother, father, brother, and best friend onto their close contact list. Once provided, the close contact list can be stored within a database communicatively coupled with the network (e.g., on the first wireless device or separate from the first wireless device). Thereafter, if determined that the first wireless device has limited communication capability, the close contact list can be retrieved and a notification that the first wireless device has limited communication capability can be sent to the wireless devices associated with the contact information on the close contact list.

In another example, the close contact list can be compiled from the most frequently contacted wireless devices. For example, a communication log of the first wireless device can be analyzed to determine the wireless devices that most frequently contact the first wireless device or vice versa. The close contact list can then be compiled from the contact information associated with these devices. Alternatively or additionally, the close contact list can include the most recently contacted wireless devices. Thus, the close contact list can include contact information associated with wireless devices selected by the user of the first wireless device, the most frequently contacted wireless devices, or the most recently contacted wireless devices. In this way, the notification that the first wireless device has limited communication capability can be limited to wireless devices to which the notification is likely to be useful.

In another example, the notification can be transmitted to a wireless device in response to that wireless device attempting to contact the first wireless device. For example, when a second wireless device attempts to message or call the first wireless device, the second wireless device can receive a notification that the first wireless device has limited communication capability. Thus, a user of the second wireless device can receive notice that the user of the first wireless device may not be able to receive or respond to their communication.

In aspects, the notification can be transmitted to the wireless devices exclusive of intervention by the first wireless device. This can be particularly beneficial because the first wireless device can have limited communication capability that can limit the first wireless device's ability to receive or respond to a communication. In aspects, the notification can be transmitted by one or more component of a mobile network without transmitting any indication of the notification to the first wireless device or without receiving explicit approval to transmit the notification from the first wireless device. For example, when the notification is transmitted in response to the second wireless device attempting to contact the first wireless device, the notification that the first wireless device has a limited communication capability can be transmitted exclusive of the communication from the second wireless device being transmitted to or received by the first wireless device. Similarly, when the notification that the first wireless device has a limited communication capability is transmitted to a close contact list, the close contact list can be retrieved from a database communicatively coupled to the network, and a component of the network can transmit the notification to the wireless devices associated with contact information in the close contact list without intervention from the first wireless device. In doing so, the notification can be provided even when the first wireless device is unable to receive communications. Moreover, even if the first wireless device can receive communications, the lack of intervention required by the first wireless device can limit communication traffic on the resource-constrained network, thereby preserving the already limited resources available.

In some cases, the user of the first wireless device can control whether the notification that the first wireless device has a limited communication capability is transmitted. For example, the first wireless device can enable or disable the feature of transmitting the notification prior to the notification being triggered. Thus, when a situation occurs in which the notification would otherwise be sent, it can first be checked whether the notification feature is enabled or disabled; when enabled, the notification is transmitted and, when disabled, the notification is not transmitted. Alternatively or additionally, when a situation occurs in which the notification would otherwise be sent, a confirmation can be transmitted to the first wireless device to confirm that the user of the first wireless device would like to notify one or more wireless devices that the first wireless device has a limited communication capability. The user of the first wireless device can then indicate whether to transmit the notification or not transmit the notification. The authorization to transmit the notification can be general to all of the wireless devices to which the notification is to be sent or to one or more specific wireless devices. In response to receiving the authorization, the notification can be transmitted to the wireless devices. In this way, the user of the first wireless device can control the transmission of the notification.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage regions 112-1 through 112-4 (also referred to individually as "coverage region 112" or collectively as "coverage regions 112"). The coverage region 112 for a base station 102 can be divided into sectors making up only a portion of the coverage region (not shown). The network 100 can include base stations of different types (e.g., macro and/or small cell base stations). In some implementations, there can be overlapping coverage regions 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage region (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage region of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Example Wireless Communication Network

Figure 2:
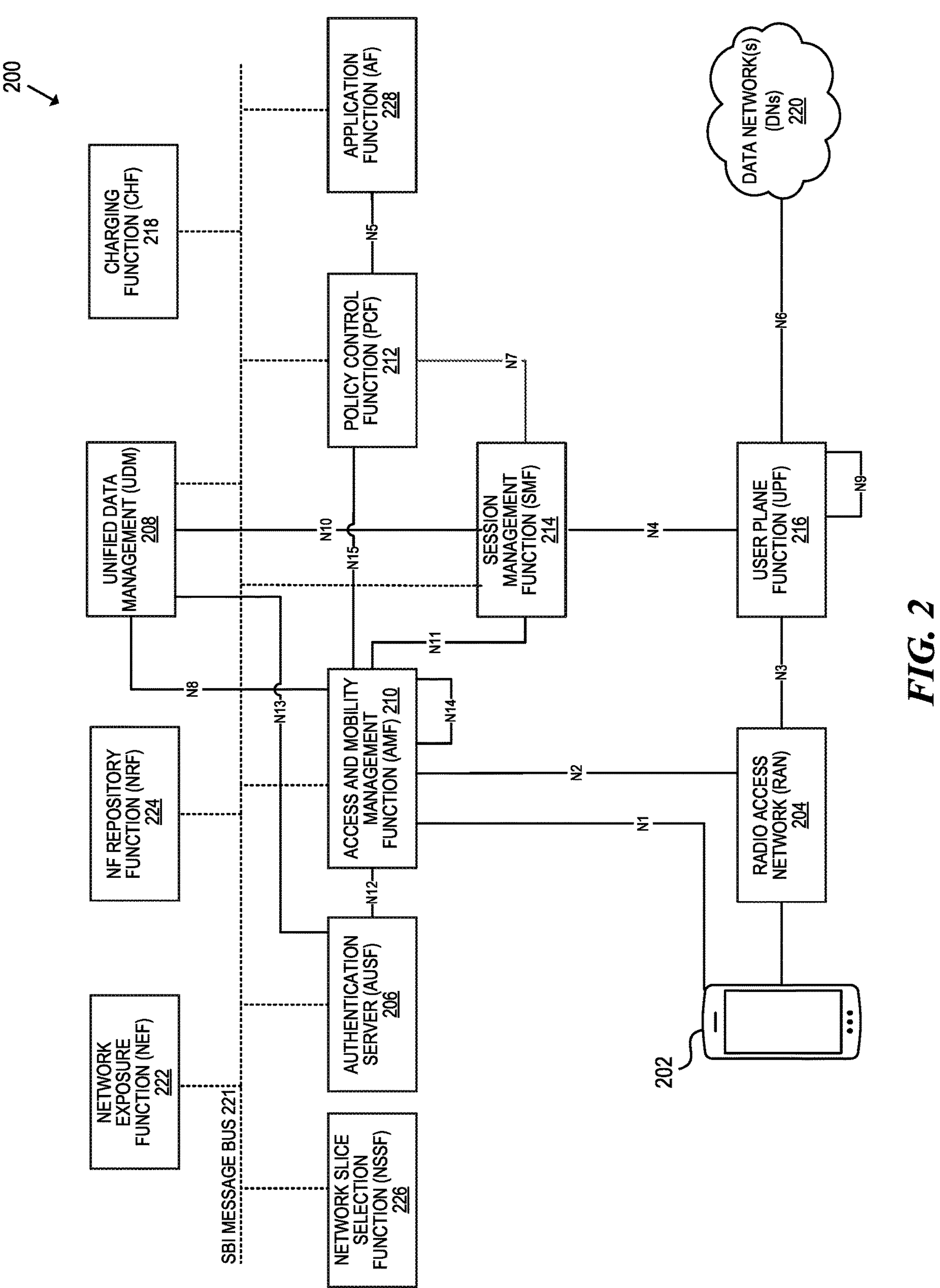
FIG. 2 illustrates an example of a wireless communication network in accordance with aspects of the present technology.

FIG. 2 illustrates an example of a wireless communication network 200 in accordance with aspects of the present technology. For example, the wireless communication network 200 can include 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Limited Communication Capability Notifications

Figure 3:
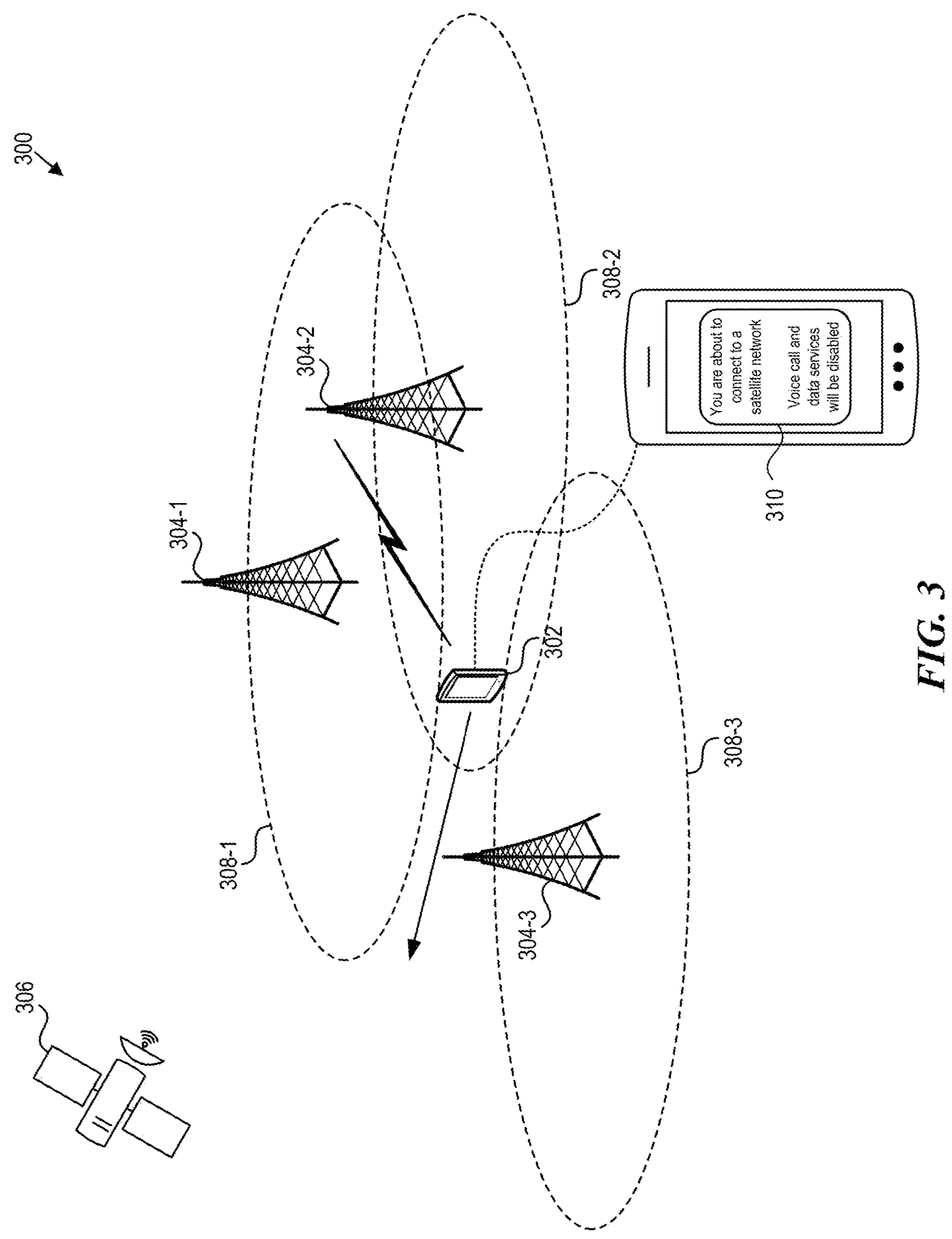
FIG. 3 illustrates a wireless communication system that includes a wireless device located within a cumulative coverage region provided by one or more terrestrial networks in accordance with an aspect of the present technology.

FIG. 3 illustrates a wireless communication system 300 that includes a wireless device 302 (e.g., an example of the wireless device 104 of FIG. 1 or the wireless device 202 of FIG. 2) located within a cumulative coverage region provided by one or more terrestrial networks (e.g., 3G, LTE, 4G, 5G, or other terrestrial networks) in accordance with an aspect of the present technology. The wireless communication system 300 includes one or more terrestrial networks (e.g., home networks or partner networks) implemented at least partially through base stations 304 (e.g., base station 304-1, base station 304-2, and base station 304-3) and one or more non-terrestrial networks implemented at least partially through satellites 306. The base stations 304 facilitate wireless services within respective coverage regions 308 (e.g., coverage region 308-1, the coverage region 308-2, and the coverage region 308-3). For example, the base station 304-1, base station 304-2, and base station 304-3 facilitate wireless services within the coverage region 308-1, the coverage region 308-2, and the coverage region 308-3, respectively. The coverage regions 308 collectively implement the cumulative coverage region provided by the terrestrial networks.

As illustrated in FIG. 3, the wireless device 302 is located within a coverage region 308-2 provided by the base station 304-2. In this way, the terrestrial network can provide wireless services to the wireless device 302. For example, the wireless device 302 and the base station 304-2 can facilitate message, voice call, and data services. In aspects, the terrestrial network can provide an increased number of wireless services to the wireless device 302 compared to the non-terrestrial network. As further illustrated in FIG. 3, the wireless device 302 is proximate to and moving toward a boundary region (indicated by an arrow in FIG. 3) of the cumulative coverage region. Thus, the wireless device 302 is about to leave the coverage region 308-2 and possibly connect to a more resource-constrained network, such as a non-terrestrial network. Accordingly, the user can benefit from being alerted of the possible change in connectivity to allow the user to understand his or her upcoming service restrictions and utilize the more capable terrestrial network for any last-minute communications.

It can be determined (e.g., by the wireless device 302 or one or more components of the non-terrestrial or terrestrial network) that the wireless device 302 is about to connect to the resource-constrained non-terrestrial network by determining the location or heading of the wireless device 302. For example, the location of the wireless device 302 can be determined and compared to a boundary of the cumulative coverage region (e.g., provided by the coverage regions 308) provided by the base stations 304. The location of the wireless device 302 can be determined through any number of techniques, including triangulation or any other location services provided by the non-terrestrial network or the terrestrial network. If the wireless device 302 is determined to be proximate (e.g., within 10 feet, within 50 feet, within 100 feet, within a half mile, within a mile, and so on) to the boundary of the cumulative coverage region, it can be determined that the wireless device 302 is about to leave the cumulative coverage region.

In some cases, the wireless device 302 is only determined to be about to leave the cumulative coverage region when the wireless device 302 is determined to be moving closer to the boundary of the cumulative coverage region. The heading or velocity of the wireless device 302 can be determined based on a comparison of current location estimates of the wireless device 302 and previous location estimates of the wireless device 302. In other cases, the heading or velocity of the wireless device 302 can be determined from one or more sensors on the wireless device 302 (e.g., a velocity sensor, an accelerometer, and the like). In yet other aspects, the location and the heading or velocity of the wireless device 302 can be used to estimate a time until the wireless device 302 leaves the cumulative coverage region, and the wireless device 302 can be determined to be about to leave the cumulative coverage region when the time is less than a threshold time (e.g., 10 seconds, 30 seconds, 1 minute, 5 minutes, 10 minutes, or any amount of time therebetween).

In some cases, the wireless device 302 can leave the coverage region 308-2 of the base station 304-2 and enter another coverage region provided by a different base station of the terrestrial network (e.g., coverage region 308-1 provided by base station 304-1 or coverage region 308-3 provided by base station 304-3). In such cases, the wireless device 302 may not connect to the non-terrestrial network but, instead, stay connected to the terrestrial network. Thus, in some cases, the determination that the wireless device 302 is about to connect to the non-terrestrial network can include determining that the wireless device 302 is about to leave the cumulative coverage region rather than the individual coverage region 308-2 provided by the base station 304-2. The cumulative coverage region or the individual coverage regions 308 can be determined based on coverage maps stored on the wireless device 302 or on the terrestrial or non-terrestrial network. The terrestrial or non-terrestrial network can be used to provide the coverage maps to the wireless device 302 (e.g., when updates to the coverage maps are made, at predetermined intervals, or when a request to compare the location of the wireless device 302 to the cumulative coverage region is made). Once received from the network, the wireless device 302 can store the coverage maps.

Once it is determined that the wireless device 302 is about to leave the cumulative coverage region provided by the base stations 304, it can be determined that the wireless device 302 is about to connect to the non-terrestrial network provided by the satellite 306. In some cases, this determination can include comparing the predicted location of the wireless device 302 to the coverage region supported by the satellite 306 (e.g., determined from coverage maps). If the wireless device 302 is predicted to be within the coverage region of the satellite 306, it can be determined that the wireless device 302 is about to connect to the non-terrestrial network. In some cases, the determination can further include determining that the wireless device 302 is capable of non-terrestrial communication services. For example, some wireless devices may not be subscribed to a wireless service plan that allows for non-terrestrial communication services. As a result, the wireless device 302 will not connect to the non-terrestrial network, even once the wireless device 302 leaves the coverage region provided by the base stations 304.

Once it is determined that the wireless device 302 is about to connect to the non-terrestrial network, a message 310 can be displayed on the wireless device 302 to provide the user an indication that the wireless device 302 is about to connect to the non-terrestrial network. The message 310 can be provided by the wireless device 302 or by the terrestrial or non-terrestrial network. As specific examples, the message 310 can include a short message service (SMS) message, a rich communication service (RCS) message, a push notification, a pop up, or the like. The message 310 can be presented on a display of the wireless device 302.

In addition to conveying the upcoming connection to a non-terrestrial network, the message 310 can include further details regarding the services available on the non-terrestrial network. Some mobile network providers may choose to utilize different service plans or pricing plans for services on non-terrestrial networks, for example, due to the reduced resources available on these networks. Thus, the services available to a user on a non-terrestrial network can be different from, or come at a different cost to, the services provided on a terrestrial network. In this way, the user of the wireless device 302 can benefit from being informed of the services that will be available on the non-terrestrial network. For example, the preemptive knowledge of the resource-constrained services can enable the user to perform any last-minute communications using the terrestrial network, thus reducing the overall burden on the resource-constrained non-terrestrial network and, in some cases, reducing user cost.

The wireless device 302 or one or more components of the non-terrestrial or terrestrial network can analyze a subscription plan of the wireless device 302 to determine the services available on the non-terrestrial network. The availability of the services can also depend on the services that the non-terrestrial network is capable of providing. Thus, in some cases, determining the services available on the non-terrestrial network can include comparing the services enabled by the subscription plan to the services provided by the non-terrestrial network. The available services can be presented to the user in the message 310 displayed on the wireless device 302. As illustrated, the message 310 indicates that the user is about to connect to a non-terrestrial network and that voice call and data services will be disabled. In other examples, the message 310 can indicate the services that will be available/unavailable on the non-terrestrial network, the cost of services that will be available on the non-terrestrial network (e.g., based on the subscription plan), or the amount of time until the wireless device 302 is expected to connect to the non-terrestrial network. In general, the information can be used by the user of the wireless device 302 to plan for the upcoming connection change while still connected to the terrestrial network.

Figure 4:
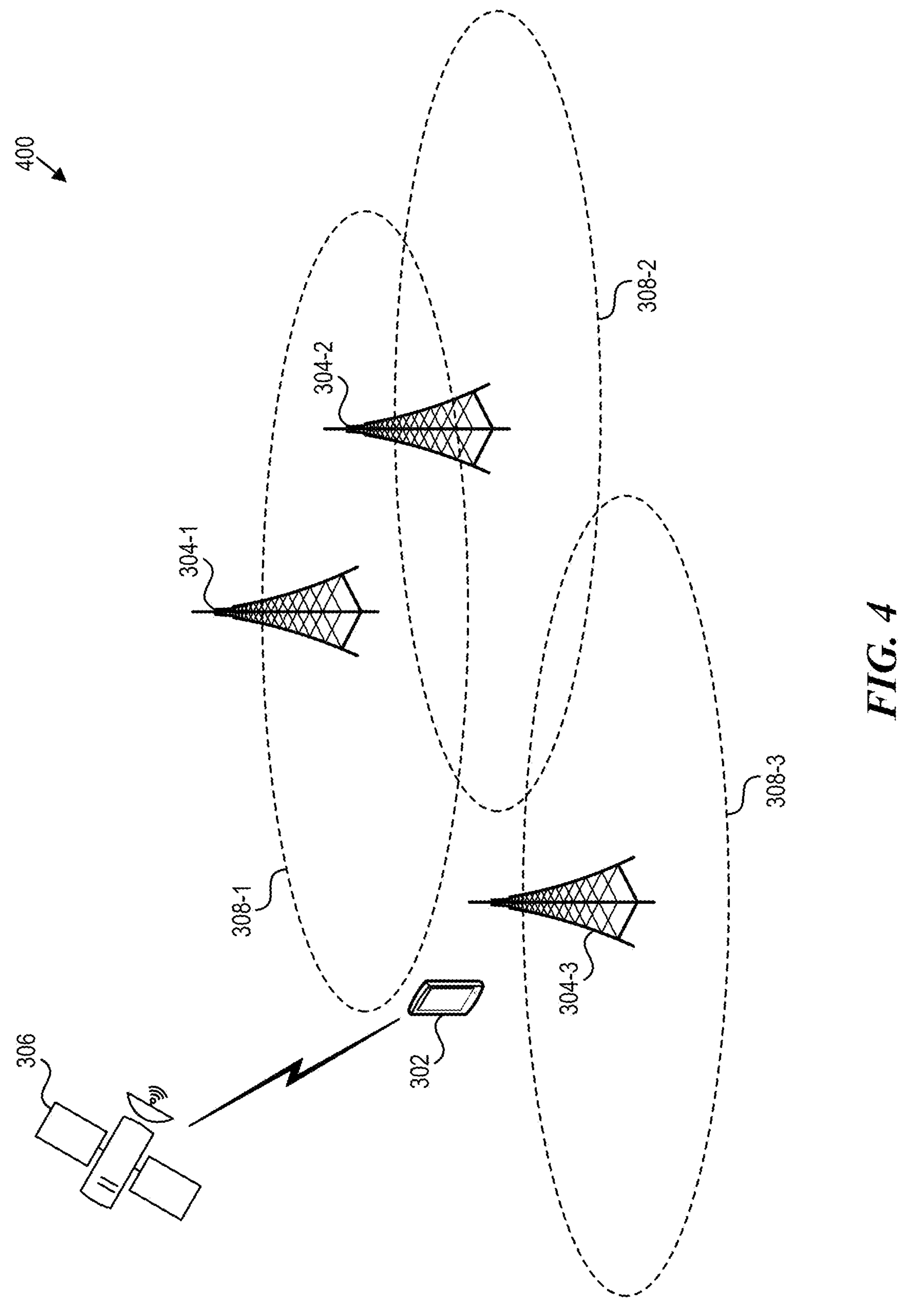
FIG. 4 illustrates a wireless communication system that includes a wireless device located outside of a cumulative coverage region provided by one or more terrestrial networks in accordance with an aspect of the present technology.

FIG. 4 illustrates a wireless communication system 400 that includes the wireless device 302 located outside of a cumulative coverage region provided by one or more terrestrial networks in accordance with an aspect of the present technology. The wireless communication system 400 can correspond to the wireless communication system 300 at a later time once the wireless device 302 has left the cumulative coverage region provided by the base stations 304. As illustrated, the wireless device 302 is not within any of the coverage regions 308 provided by the base stations 304. Thus, communication services cannot be provided by the terrestrial network. Instead, the wireless device 302 can connect to a non-terrestrial network such that the satellite 306 facilitates communications to/from the wireless device 302.

The non-terrestrial network can provide any number of wireless communication services to the wireless device 302. For example, the non-terrestrial network can provide messaging services (e.g., SMS, RCS, or the like), voice calling services, data services, or any other wireless communication service. In aspects, the services available on the non-terrestrial network are more restricted than those provided by the terrestrial network. The wireless services provided to the wireless device 302 by the non-terrestrial network can be based on a wireless plan to which the wireless device 302 is subscribed. In general, the wireless services provided on the non-terrestrial network (and the cost of these services) correspond to the wireless services indicated in the message 310 illustrated in FIG. 3.

Although not illustrated in FIG. 4, the message 310 of FIG. 3 could be alternatively or additionally presented once the wireless device 302 connects to the non-terrestrial network. For example, the message 310 can be presented in response to the wireless device connecting with the non-terrestrial network to provide the user information about the wireless services available on the network or the cost of these services. In doing so, the user can refrain from requesting communication services that are not provided by the non-terrestrial network and can understand the costs associated with communication services before requesting the services and incurring these charges.

Figure 5:
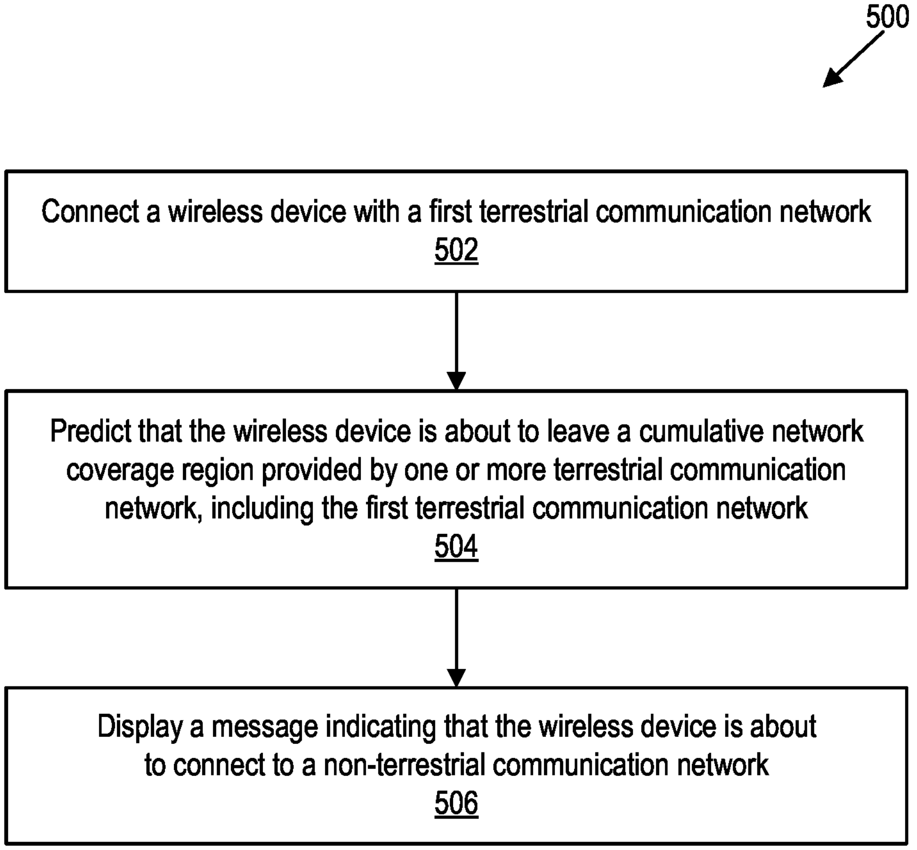
FIG. 5 illustrates a method for providing limited communication capability notifications in accordance with aspects of the present technology.

FIG. 5 illustrates a method 500 for providing non-terrestrial network connection notifications in accordance with aspects of the present technology. Various operations of the method 500 can be performed by a wireless device (e.g., the wireless device 104 of FIG. 1, the wireless device 202 of FIG. 2, or the wireless device 302 of FIGS. 3 and 4), a component of a terrestrial network to which the wireless device can connect, or a component of a non-terrestrial network to which the wireless device can connect. Although illustrated in a particular order, the operations of method 500 can be repeated or reorganized. Moreover, the method 500 can omit one or more operations described herein or include one or more additional operations, such as operations of any other method disclosed herein.

At 502, a wireless device is connected with a first terrestrial communication network such that a wireless communication service is provided to the wireless device by the first terrestrial communication network. The wireless device can be located within a coverage region provided by the first terrestrial communication network. Within the coverage region, the first terrestrial communication network can provide wireless communication services through one or more base stations.

At 504, while connected with the first terrestrial network, a prediction is made that the wireless device is about to leave a cumulative network coverage region provided by one or more terrestrial communication networks with which the wireless device is allowed to connect. The one or more terrestrial communication networks include the first terrestrial communication network. The cumulative network coverage region can include coverage regions provided by the base stations used by the one or more terrestrial networks to facilitate communication services.

The prediction that the wireless device is about to leave the cumulative coverage region can be based on a comparison of the location of the wireless device to one or more coverage maps of the one or more terrestrial communication networks. For example, the wireless device can be determined to be about to leave the cumulative network coverage region when the wireless device is proximate to a boundary of the cumulative network coverage region. The location of the wireless device can be determined through one or more location services provided by any of the one or more terrestrial network, the non-terrestrial network, or any other location service. The coverage maps can be stored on the wireless device or provided to the wireless device over any of the one or more terrestrial networks or the non-terrestrial network. In aspects, the coverage map can include information regarding the coverage regions provided by base stations of the one or more terrestrial networks.

In some cases, the prediction that the wireless device is about to leave the cumulative network coverage region is based on a location and a velocity or heading of the wireless device. The velocity or heading of the wireless device can be determined from previous location information about the wireless device or one or more sensors on the wireless device. In aspects, the wireless device can be determined to be about to leave the cumulative network coverage region when the wireless device is proximate to and moving closer to the boundary of the cumulative network coverage region. In some cases, an amount of time until the wireless device leaves the cumulative network coverage region can be predicted based on the location and the velocity or heading of the wireless device. In aspects, the wireless device can be predicted to be about to leave the cumulative network coverage region when the amount of time until the wireless device leaves the cumulative network coverage region is less than a threshold time.

At 506, in response to predicting that the wireless device is about to leave the cumulative network coverage region, a message indicating that the wireless device is about to connect to a non-terrestrial communication network can be displayed. In some cases, the message indicating that the wireless device is about to connect to the non-terrestrial network is displayed in response to determining that the wireless device is moving to a location that is within a first network coverage region of the non-terrestrial network. The message can indicate one or more services available on the non-terrestrial communication network or one or more services unavailable on the non-terrestrial communication network. The services available/unavailable on the non-terrestrial network can be determined based on a subscription plan of the wireless device. In some cases, the message can indicate a cost for services available on the non-terrestrial network (e.g., based on the subscription plan of the wireless device). In general, the message can provide information that is utilized by the user to provide insight into an upcoming reduction in wireless services, which can enable the user to perform any last-minute communications using the more capable terrestrial network.

Alternatively, the message can be transmitted after the wireless device connects to the non-terrestrial network. In this case, the user does not benefit from preemptively knowing the capabilities of the non-terrestrial network but, instead, benefits from information about the current restrictions to wireless services on the non-terrestrial network to which he or she is connected.

Figure 6:
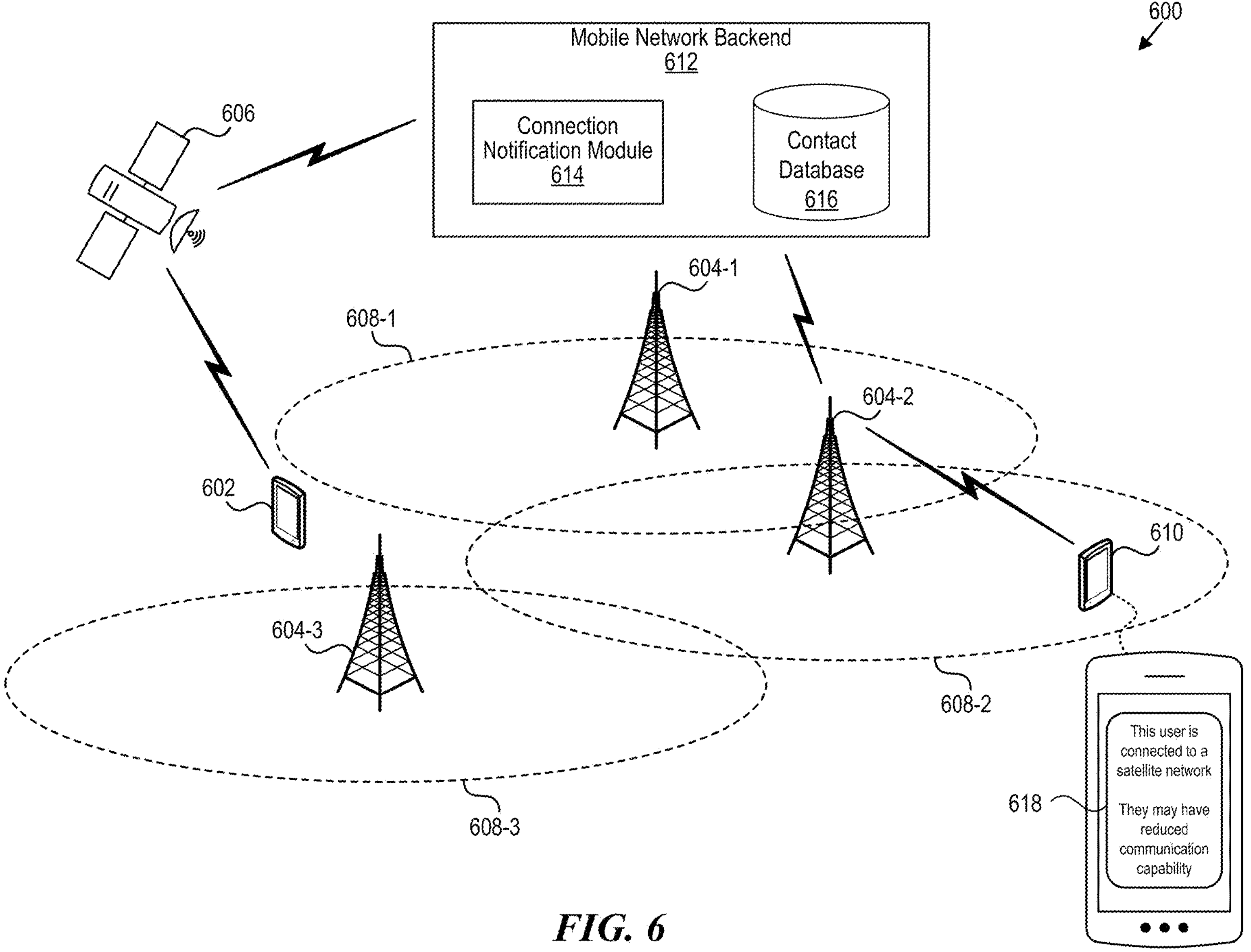
FIG. 6 illustrates a wireless communication system used to facilitate limited communication capability notifications in accordance with aspects of the present technology.

FIG. 6 illustrates a wireless communication system 600 used to facilitate non-terrestrial network connection notifications in accordance with aspects of the present technology. As illustrated, the wireless communication system 600 includes a wireless device 602 (e.g., an example of the wireless device 104 of FIG. 1 or the wireless device 202 of FIG. 2). The wireless communication system 600 further includes one or more terrestrial networks (e.g., 3G, LTE, 4G, 5G, or other terrestrial networks) implemented at least partially through base stations 604 (e.g., base station 604-1, base station 604-2, and base station 604-3) and one or more non-terrestrial networks implemented at least partially through satellites 606. The base stations 604 facilitate wireless services within respective coverage regions 608 (e.g., coverage region 608-1, the coverage region 608-2, and the coverage region 608-3). For example, the base station 604-1, base station 604-2, and base station 604-3 facilitate wireless services within the coverage region 608-1, the coverage region 608-2, and the coverage region 608-3, respectively. The coverage regions 608 collectively implement the cumulative coverage region provided by the terrestrial networks. The satellites 606 similarly provide a coverage region for the non-terrestrial networks, however, due to the relative movement of the satellites 606, the coverage region of the non-terrestrial networks may change over time.

An additional wireless device 610 (or a wired device, such as a personal computer connected via Ethernet with a messaging client) is also illustrated in the wireless communication system 600. The additional wireless device 610 is illustrated within the coverage region 608-2 of the base station 604-2. Thus, the additional wireless device 610 and the wireless device 602 communicate through the terrestrial networks and the non-terrestrial networks. In other cases, however, the additional wireless device can be located in a different coverage region of the coverage regions 608 or outside the cumulative coverage regions provided by the base stations 604. Similarly, although the wireless device 602 is illustrated as being outside of the cumulative coverage regions provided by the base stations 604, in other cases, the wireless device 602 can be about to leave the cumulative coverage regions provided by the base stations 604 (e.g., as discussed with respect to FIG. 3) but still located in one or more of the coverage regions 608. Thus, the wireless device 602 and the additional wireless device 610 can communicate through one or more of the terrestrial networks or the non-terrestrial networks.

The operations of the mobile networks (e.g., the terrestrial networks and the non-terrestrial networks) can be controlled through a mobile network backend 612. The mobile network backend 612 can communicate data between two users, provide security features, manage user data, and control any other operations of the mobile networks. The mobile network backend 612 is implemented through one or more computing systems. The mobile network backend 612 can include one or more processors, memory devices, storage components, servers, transceivers, or other electronic components. In aspects, the various computing systems can control various aspects of the mobile networks.

As illustrated, the mobile network backend 612 includes a connection notification module 614 and a contact database 616. The connection notification module 614 can control the communication of a notification to one or more second wireless devices (e.g., the additional wireless device 610) to communicate when a first wireless device (e.g., the wireless device 602) has limited communication capability due to the first wireless device being connected to a resource-constrained network, such as the non-terrestrial network. The connection notification module 614 can be implemented through one or more computer systems, including one or more processors, memory devices, storage components, and other electronic components. The connection notification module 614 can be responsible for determining or receiving an indication that the first wireless device is connected to or is about to connect to a resource-constrained network. Once determined that the first wireless device is connected to or is about to connect to a resource-constrained network, the connection notification module 614 can control one or more aspects of transmitting a message. In general, the message can provide an indication of the wireless communication capability of the wireless device to one or more additional wireless devices, which can improve communications between the wireless device and the additional wireless devices, with a notification indicating that the first wireless device has limited communication capability. For example, the connection notification module 614 can determine whether it is appropriate to communicate the notification indicating that the first wireless device has limited communication capability and, if so, communicate that notification to the second wireless devices.

The mobile network backend 612 can include the contact database 616. The contact database 616 can store data associated with contact information of one or more wireless devices that are to be contacted when a particular wireless device has a limited communication capability. In aspects, the contact database 616 can have different portions associated with different users or wireless devices. In this way, each portion of the contact database 616 can store contact information of the particular wireless devices to which to send the notification when the wireless device of an associated user or the associated wireless device has a limited communication capability. In aspects, the contact information can enable the notification to be transmitted to the particular wireless devices. The contact database 616 can be located on a server or other storage component of the mobile network backend 612. In other cases, the contact database 616 can be stored on one or more storage components coupled with the mobile network backend 612, for example, one or more wireless devices connected to the mobile networks (e.g., the wireless device 602). In general, the connection notification module 614 can be communicatively coupled to the contact database 616 to enable the connection notification module to receive contact information from the contact database 616 and use the contact information to notify the one or more second wireless devices that the first wireless device has limited communication capability.

As illustrated in FIG. 6, the wireless device 602 is located beyond the coverage regions 608 provided by the base stations 604. As a result, the wireless device 602 cannot connect to the terrestrial networks and may instead connect to a non-terrestrial network provided by the satellite 606. The wireless device 602 or one or more components of the mobile network backend 612 can determine that the wireless device 602 is connected to the non-terrestrial network through any appropriate method, as discussed above. For example, the location of the wireless device 602 can be compared to one or more coverage maps of the terrestrial or non-terrestrial networks to determine if the wireless device 602 is located outside a cumulative coverage region of the terrestrial networks and inside the coverage region of the non-terrestrial network, which can indicate that the wireless device 602 is connected to or is about to connect to the non-terrestrial network. Although not illustrated in FIG. 6, a similar determination that the wireless device 602 is about to connect to a non-terrestrial network can be made when the wireless device 602 is proximate to, and in some cases, moving closer to, a boundary of the cumulative coverage region of the terrestrial networks.

Once it is determined that the wireless device 602 is connected to or is about to connect to the non-terrestrial network, the connection notification module 614 can determine whether a notification that the wireless device 602 has a limited communication capability should be transmitted to one or more wireless devices. For example, the connection notification module 614 can receive an indication that the wireless device 602 is connected to or is about to connect to the non-terrestrial network (e.g., from the wireless device 602 or one or more components of the mobile network backend 612). Once the connection notification module 614 has received the indication, the connection notification module can determine whether a service that notifies other devices when the wireless device 602 has limited communication capability is enabled for the wireless device 602. For example, a user of the wireless device 602 can enable or disable this service prior to the situation in which the wireless device 602 has limited communication capability. Thus, the connection notification module 614 can determine whether this feature is enabled by analyzing the user preferences associated with the wireless device 602. Alternatively or additionally, the connection notification module 614 can request authorization to transmit the notification from the wireless device 602 (e.g., through a message to the wireless device 602). The user of the wireless device 602 can then decide whether to authorize the notification or not.

In response to determining that the service to provide the notification is to be transmitted to one or more wireless devices, the connection notification module 614 can determine contact information associated with the one or more wireless devices to which the notification is to be sent. In some cases, the contact information can be determined from the contact database 616. For example, the user of the wireless device 602 can specify contact information of the one or more wireless devices to which the notification is to be sent. The contact information can then be stored in the contact database 616 in association with the wireless device 602 or the user of the wireless device 602. In other cases, the one or more wireless devices to which the notification is sent can be determined by analyzing a communication log of the wireless device 602 to determine the most frequently or most recently contacted wireless devices. After determining the most frequently or most recently contacted wireless devices, contact information associated with these devices can be stored in the contact database 616 to be accessed when future notifications are transmitted. Alternatively, the connection notification module 614 can determine the most frequently contacted or most recently contacted devices each time a notification is to be transmitted. In the example illustrated in FIG. 6, the wireless device 610 is selected to receive the notification.

Once the wireless device 610 is selected to receive the notification, the connection notification module 614 can begin the process of transmitting the notification to the wireless device 610. In some cases, the connection notification module 614 can request permission to transmit the notification. For example, the connection notification module 614 can transmit a communication (e.g., a SMS communication, RCS communication, a voice communication, or any other type of communication) that causes the wireless device 602 to display or output a message requesting permission of the connection notification module 614 to transmit the communication. In some cases, the request message can indicate the users to which the notification is to be transmitted. The user of the wireless device 602 can allow or disallow the notification from being transmitted through input at the wireless device 602 (e.g., touch, voice, or other input). The allowance or disallowance of the notification can be specific to each potential recipient of the notification or general to all potential recipients of the notification. In response to receiving permission to transmit the notification, the connection notification module 614 can transmit the notification to the wireless device 610. Alternatively, the notification can be transmitted exclusive of intervention from the wireless device 602 (e.g., without explicit permission from a user of the wireless device 602 in response to a request message).

The notification can be transmitted to the wireless device 610 through one or more mobile networks. In aspects, the notification can be transmitted as any form of wireless communication (e.g., an SMS message, an RCS message, a voice call, and so on). In some cases, transmission of the notification to the wireless device 610 is initiated at the mobile network backend 612 (rather than at the wireless device 602). The notification can indicate to a user of the wireless device 610 that the wireless device 602 has or is about to have limited communication capability. For example, the notification can cause a message 618 to be displayed on the wireless device 602 that indicates that the wireless device 602 has or is about to have limited communication capability. In some cases, the message 618 can indicate that the wireless device 602 is connected to or is about to connect to a non-terrestrial network. Alternatively or additionally, the message 618 can indicate the specific wireless services available on the wireless device 610. In aspects, the message 618 can convey similar information to the message 310 illustrated in and described with respect to FIG. 3. In other cases, the message 618 can be output in other forms, for example, as audio output.

Although the notification is described as being transmitted without previous communication from the wireless device 610, in some embodiments, the notification is transmitted to the wireless device 610 in response to receiving a message from the wireless device 610 directed to the wireless device 602 and determining that the wireless device 602 has a limited communication capability (e.g., due to being connected to a non-terrestrial network). In this case, the contact information of the wireless devices (e.g., wireless device 610) to which to send the notification that the wireless device 602 has limited communication capability need not be retrieved from the contact database 616. Instead, the notification can be transmitted to any device (e.g., the wireless device 610) that attempts to communicate with the wireless device 602. In other cases, the notification is only transmitted if the wireless device 610 attempts to contact the wireless device 602 and limited communication capability notifications are enabled for the wireless device 610 (e.g., in the contact information database, based on user preferences, or based on a communication log). In general, transmitting the notification in response to a wireless device attempting to contact the wireless device 602 can reduce the number of notifications transmitted to wireless devices and ensure that notifications are being transmitted to users to whom the notifications would be most useful.

In aspects, the notification can be transmitted to the wireless device 610 without delivering the communication from the wireless device 610 to the wireless device 602. For example, the notification can be controlled or initiated from the mobile network backend 612 rather than the wireless device 602. In this way, limited communication capability notifications can be transmitted even when the limited communication capability of the wireless device 602 disables the wireless device from receiving communications. Moreover, this can reduce traffic on resource-constrained networks, such as non-terrestrial networks.

As a result of receiving the notification, the user of the wireless device 610 can be made aware of a limited communication capability condition of the wireless device 602, which can explain a lack of communication from the user of the wireless device 602. In this way, user experience can be improved for the user of the wireless device 602 and the user of the wireless device 610. In aspects, embodiments of the present technology can provide greater transparency into the wireless services provided by new wireless technologies. Moreover, in embodiments in which the notification is transmitted predictively (e.g., before the wireless device 602 connects to the non-terrestrial network), the notification can enable the user of the wireless device 610 to transmit any necessary communications to the wireless device 602 before the wireless device 602 loses access to one or more wireless communication services restricted on the non-terrestrial network. In embodiments in which the notification is transmitted in response to a wireless device attempting to contact the wireless device, the number of notifications transmitted to wireless devices can be reduced and notifications can be transmitted to users to whom the notifications would be most useful. In general, embodiments of the present technology can improve the communication between the user of the wireless device 602 and the user of the wireless device 610 by providing the user of the wireless device 610 insight into the communication capability of the wireless device 602.

Figure 7:
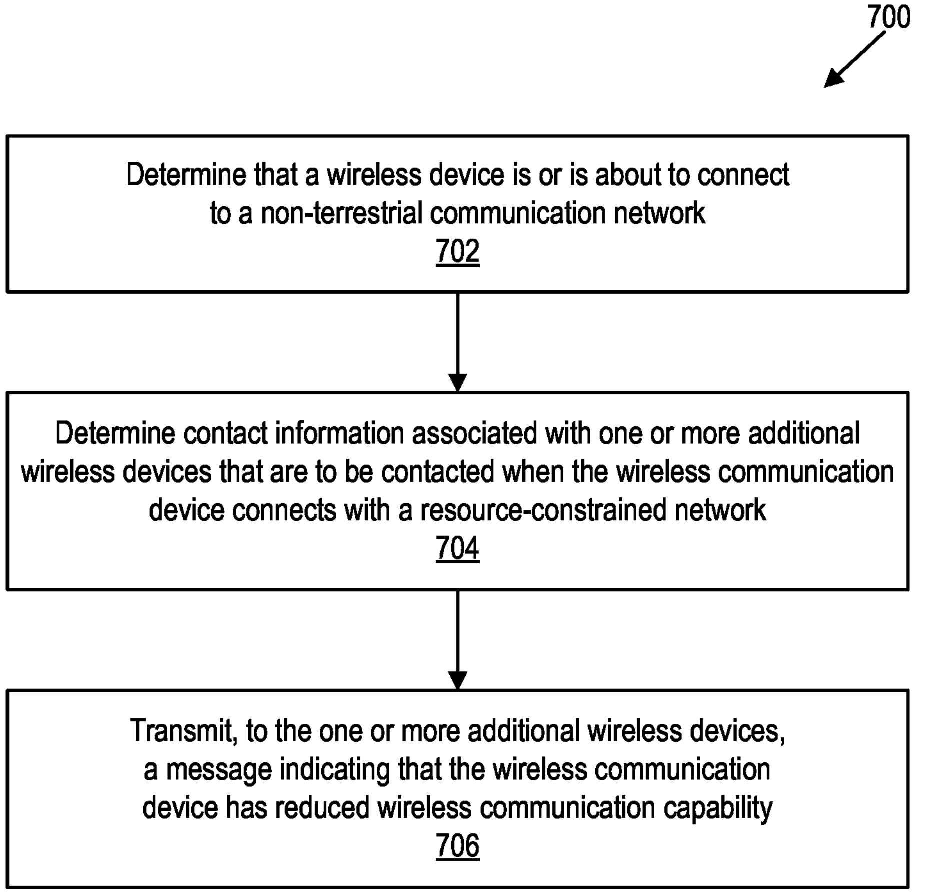
FIG. 7 illustrates a method for providing limited communication capability notifications in accordance with aspects of the present technology.

FIG. 7 illustrates a method 700 for providing limited communication capability notifications in accordance with aspects of the present technology. Various operations of the method 700 can be performed by a wireless device (e.g., the wireless device 104 of FIG. 1, the wireless device 202 of FIG. 2, or the wireless device 602 of FIG. 6) or one or more components of a mobile network backend (e.g., mobile network backend 612 of FIG. 6 or connection notification module 614 of FIG. 6). Although illustrated in a particular order, the operations of method 700 can be repeated or reorganized. Moreover, the method 700 can omit one or more operations described herein or include one or more additional operations, such as operations of any other method disclosed herein.

At 702, a wireless communication device is determined to be connected to or about to connect to a non-terrestrial communication network such that the non-terrestrial communication network provides a wireless communication service to the wireless communication device. In some cases, determining that the wireless communication device is connected to the non-terrestrial communication network includes determining that the wireless communication device is located outside of one or more coverage regions provided by one or more terrestrial networks and within a coverage region provided by the non-terrestrial network. In aspects, determining that the wireless communication device is about to connect to a non-terrestrial network includes determining that the wireless communication device is about to leave a cumulative coverage region provided by one or more terrestrial networks.

At 704, contact information associated with one or more additional wireless communication devices that are to be contacted when the wireless communication device connects with a resource-constrained network is determined. The contact information can be received from a portion of a database associated with the wireless communication device or a user of the wireless communication device. The contact information within the portion of the database can be provided by a user of the wireless communication device. In aspects, the contact information can be determined as the contact information associated with additional wireless devices that are most frequently contacted or most recently contacted by the wireless device. The most frequently contacted or most recently contacted wireless devices can be determined from a communication log of the wireless device.

At 706, a message indicating that the wireless communication device has reduced wireless capability is transmitted to the one or more additional wireless communication devices based on the contact information. The message can be transmitted in response to determining that the wireless communication device is connected to the non-terrestrial communication network. In aspects, the message can be transmitted by a wireless communication node of a mobile network without intervention by the wireless communication device. In some embodiments, the message can be sent after receiving explicit approval from the wireless communication device (e.g., in response to a request to send the message from the mobile network). In yet other aspects, the message can be transmitted after it is determined that a service to provide the message is enabled for the wireless communication device. In general, the message can provide an indication of the wireless communication capability of the wireless device to one or more additional wireless devices, which can improve communications between the wireless device and the additional wireless devices.

Figure 8:
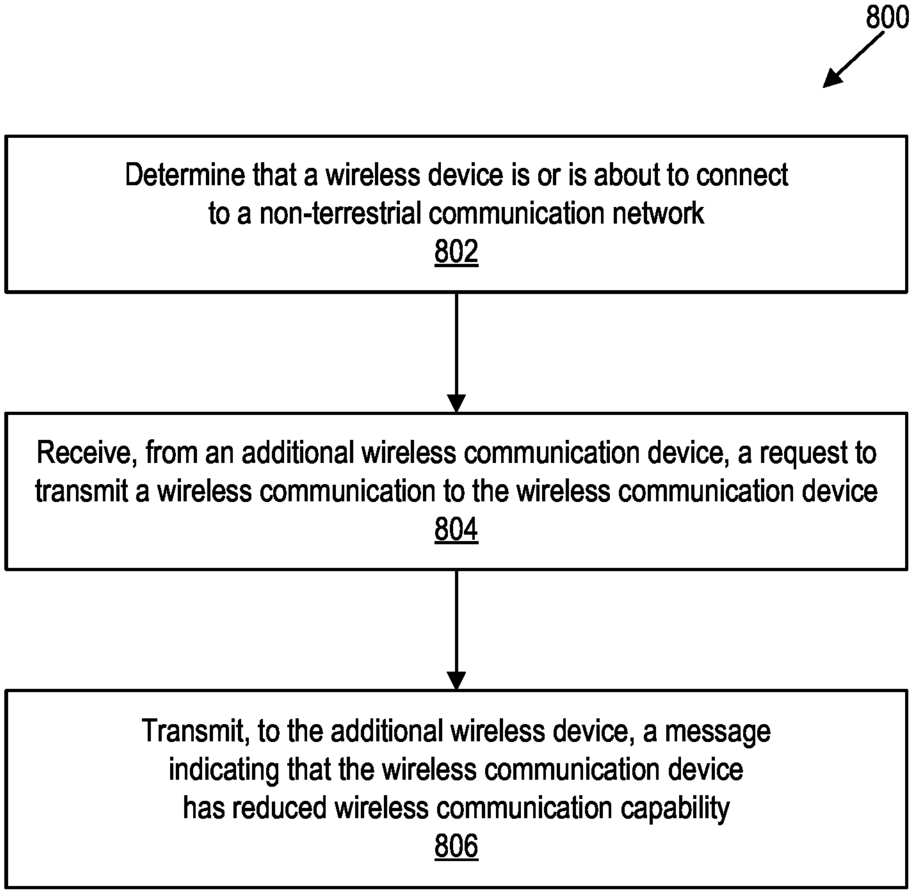
FIG. 8 illustrates a method for providing limited communication capability notifications in accordance with aspects of the present technology.

FIG. 8 illustrates a method 800 for providing limited communication capability notifications in accordance with aspects of the present technology. Various operations of the method 800 can be performed by a wireless device (e.g., the wireless device 104 of FIG. 1, the wireless device 202 of FIG. 2, or the wireless device 602 of FIG. 6) or one or more components of a mobile network backend (e.g., mobile network backend 612 of FIG. 6 or connection notification module 614 of FIG. 6). Although illustrated in a particular order, the operations of method 800 can be repeated or reorganized. Moreover, the method 800 can omit one or more operations described herein or include one or more additional operations, such as operations of any other method disclosed herein.

At 802, a wireless communication device is determined to be connected to a non-terrestrial communication network such that the non-terrestrial communication network provides a wireless communication service to the wireless communication device. In aspects, the wireless communication device can be determined to be connected to the non-terrestrial communication network in a similar manner as discussed at 702 of FIG. 7.

At 804, a request to transmit a wireless communication to the wireless communication device is received from an additional wireless communication device. For example, the additional wireless communication device can transmit a text message or voice call to the wireless communication device.

At 806, a message indicating that the wireless communication device has reduced wireless capability is transmitted to the additional wireless communication device. The message can be transmitted in response to determining that the wireless communication device is connected to the non-terrestrial network and receiving the request to transmit the wireless communication to the wireless communication device. In aspects, the message can include a text message or a voice call. In some cases in which the wireless communication is a voice call, the message can include a voice message that replaces a voicemail message. For example, a voicemail message of the wireless communication device (e.g., a message indicating that the user of the wireless communication device is unavailable and instructing a caller to leave a message) can be replaced with a message that indicates that the wireless communication device has reduced wireless capability. In some cases, the wireless device can be transmitted to the additional wireless communication device regardless of a transmission of the wireless communication to the wireless communication device. In yet other aspects, the message can be sent in response to determining that contact information associated with the additional wireless device matches contact information associated with one or more additional wireless devices to be contacted when the wireless communication device has reduced communication capability. In general, the message can provide an indication of the wireless communication capability of the wireless communication device to a user that contacts the wireless communication device, which can improve communications between the wireless communication device and the additional wireless communication devices.

Computing System

Figure 9:
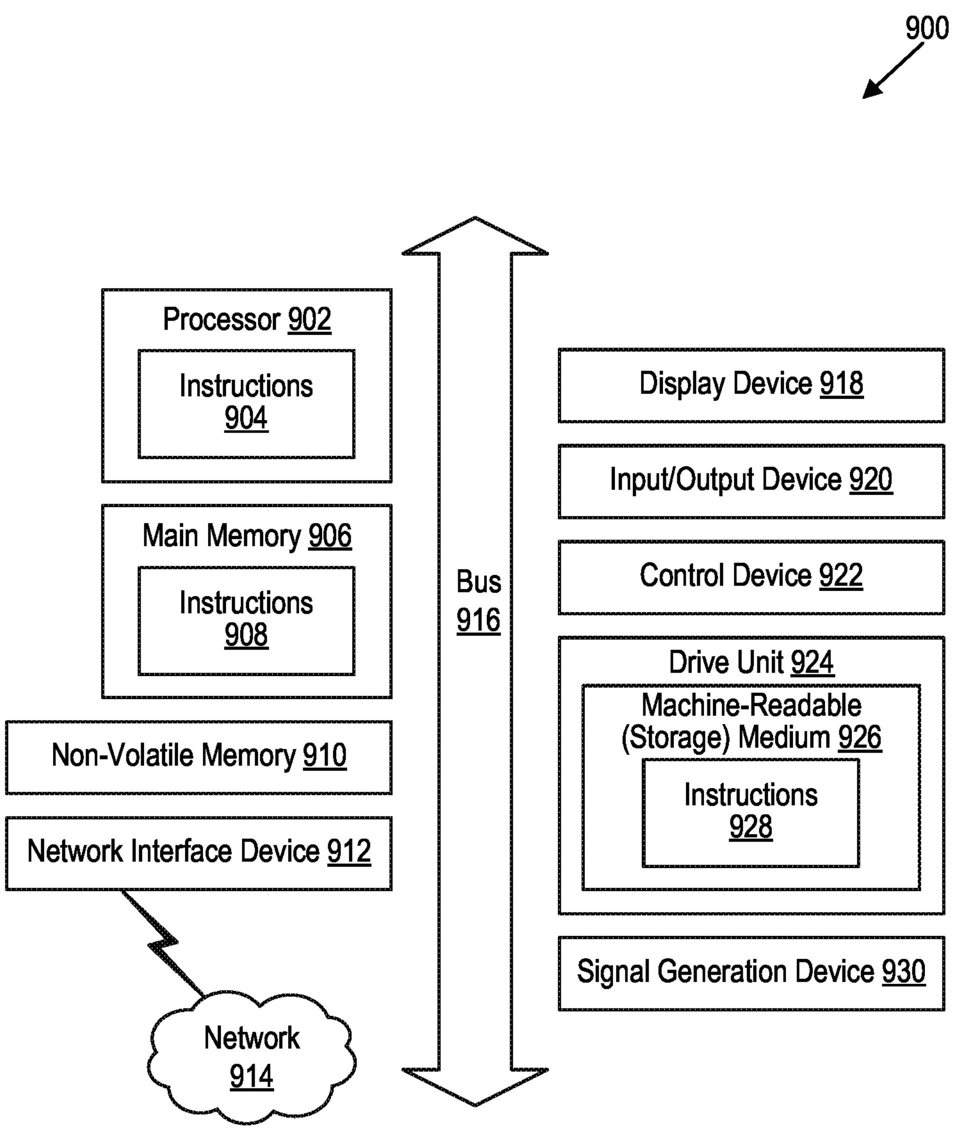
FIG. 9 illustrates components of a computing device that can implement aspects of the present technology.

FIG. 9 is a block diagram that illustrates an example of a computing system 900 in which at least some operations described herein can be implemented. As shown, the computing system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computing system 900 is intended to illustrate a hardware device on which components illustrated or described relative to the examples of the figures and any other components described in this specification can be implemented.

The computing system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computing system 900 can be an embedded computing system, a system-on-chip (SOC), a single-board computing system (SBC), or a distributed system such as a mesh of computing systems, or it can include one or more cloud components in one or more networks. Where appropriate, one or more computing systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways.

Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A wireless communication node comprising:

at least one hardware processor; and at least one non-transitory memory storing instructions that, when executed by the at least one hardware processor, cause the wireless communication node to:

determine that a wireless communication device is connected to a non-terrestrial communication network such that the non-terrestrial communication network provides a wireless communication service to the wireless communication device;

determine contact information associated with one or more additional wireless communication devices that are to be contacted when the wireless communication device connects with a resource-constrained network; and in response to determining that the wireless communication device is connected to the non-terrestrial communication network, transmit, to the one or more additional wireless communication devices and based on the contact information, a message indicating that the wireless communication device has reduced wireless capability.

2. The wireless communication node of claim 1, wherein the instructions further cause the wireless communication node to receive the contact information from a portion of a database that is communicatively coupled with the wireless communication node, the portion of the database associated with the wireless communication device, or a user of the wireless communication device.

3. The wireless communication node of claim 1, wherein the instructions further cause the wireless communication node to:

analyze a communication log of the wireless communication device; and determine most frequently contacted wireless communication devices or most recently contacted wireless communication devices as the one or more additional wireless communication devices based on the analysis of the wireless communication log.

4. The wireless communication node of claim 1, wherein the instructions further cause the wireless communication node to transmit the message to the one or more additional wireless communication devices without intervention by the wireless communication device.

5. The wireless communication node of claim 1, wherein the instructions further cause the wireless communication node to:

determine that a service to send a notification to the one or more additional wireless communication devices when the wireless communication device has reduced wireless capability is enabled; and in response to determining that the service to send the notification is enabled, transmit the message to the one or more additional wireless communication devices.

6. The wireless communication node of claim 1, wherein the instructions further cause the wireless communication node to:

in response to determining that the wireless communication device is connected to the non-terrestrial communication network, transmit, to the wireless communication device, a request to transmit the message to the one or more additional wireless communication devices;

in response to transmitting the request to transmit the message to the one or more additional wireless communication devices, receive, from the wireless communication device, a confirmation to transmit the message to the one or more additional wireless communication devices; and in response to receiving the confirmation to transmit the message, transmit the message to the one or more additional wireless communication devices.

7. A method comprising:

determining that a wireless communication device is connected to or is about to connect to a non-terrestrial communication network such that the non-terrestrial communication network provides a wireless communication service to the wireless communication device;

determining contact information associated with one or more additional wireless communication devices that are to be contacted when the wireless communication device connects with a resource-constrained network; and in response to determining that the wireless communication device is connected to the non-terrestrial communication network, transmitting, to the one or more additional wireless communication devices and based on the contact information, a message indicating that the wireless communication device has reduced wireless capability.

8. The method of claim 7, further comprising receiving the contact information from a portion of a database, the portion of the database associated with the wireless communication device or a user of the wireless communication device.

9. The method of claim 7, further comprising:

analyzing a communication log of the wireless communication device; and determining most frequently contacted wireless communication devices or most recently contacted wireless communication devices as the one or more additional wireless communication devices based on the analysis of the communication log.

10. The method of claim 7, further comprising transmitting the message to the one or more additional wireless communication devices without intervention by the wireless communication device.

11. The method of claim 7, further comprising:

determining that a service to send a notification to the one or more additional wireless communication devices when the wireless communication device has reduced wireless capability is enabled; and in response to determining that the service to send the notification is enabled, transmitting the message to the one or more additional wireless communication devices.

12. The method of claim 7, further comprising:

in response to determining that the wireless communication device is connected to the non-terrestrial communication network, transmitting, to the wireless communication device, a request to transmit the message to the one or more additional wireless communication devices;

in response to transmitting the request to transmit the message to the one or more additional wireless communication devices, receiving, from the wireless communication device, a confirmation to transmit the message to the one or more additional wireless communication devices; and in response to receiving the confirmation to transmit the message, transmitting the message to the one or more additional wireless communication devices.

13. The method of claim 7, further comprising:

determining that the wireless communication device is about to leave a cumulative coverage region provided by one or more terrestrial networks; and in response to determining that the wireless communication device is about to leave the cumulative coverage region provided by one or more terrestrial networks, determining that the wireless communication device is about to connect to the non-terrestrial communication network.

14. A wireless communication node comprising:

at least one hardware processor; and at least one non-transitory memory storing instructions that, when executed by the at least one hardware processor, cause the wireless communication node to:

determine that a wireless communication device is connected to a non-terrestrial communication network such that the non-terrestrial communication network provides a wireless communication service to the wireless communication device;

receive, from an additional wireless communication device, a request to transmit a wireless communication to the wireless communication device; and in response to determining that the wireless communication device is connected to the non-terrestrial communication network and receiving the request to transmit the wireless communication, transmit, to the additional wireless communication device, a message indicating that the wireless communication device has reduced wireless capability.

15. The wireless communication node of claim 14, wherein the instructions further cause the wireless communication node to transmit the message to the additional wireless communication device regardless of a transmission of the wireless communication to the wireless communication device.

16. The wireless communication node of claim 14, wherein:

the wireless communication comprises a voice call; and the message comprises an audio message indicating that the wireless communication device has reduced wireless capability.

17. The wireless communication node of claim 14, wherein:

the wireless communication comprises a text message; and the message comprises an additional text message indicating that the wireless communication device has reduced wireless capability.

18. The wireless communication node of claim 14, wherein the instructions further cause the wireless communication node to:

determine that a service to send a notification to the additional wireless communication device when the wireless communication device has reduced wireless capability is enabled; and in response to determining that the service to send the notification is enabled, transmit the message to the additional wireless communication device.

19. The wireless communication node of claim 14, wherein the instructions further cause the wireless communication node to:

determine that information associated with the additional wireless communication device matches contact information stored within a portion of a database, the portion of the database associated with the wireless communication device or a user of the wireless communication device and storing contact information indicative of one or more first wireless communication devices to notify when the wireless communication device has reduced wireless capability; and in response to determining that the information associated with the additional wireless communication device matches the contact information, transmit the message to the additional wireless communication device.

20. The wireless communication node of claim 14, wherein the message indicates that the wireless communication device is connected to the non-terrestrial communication network.

* * * * *